3,660,421
1-CARBAMOYL-2-CARBALKOXYAMINO-
BENZIMIDAZOLES
Hans Osieka, Ludwigshafen, Karl-Heinz Koenig, Frankenthal, and Ernst-Heinrich Pommer, Limburgerhof, Germany, assignors to Badische Anilin- & Soda-Fabrik Aktiengesellschaft, Ludwigshafen (Rhine), Germany
No Drawing. Filed Nov. 25, 1969, Ser. No. 879,937
Claims priority, application Germany, Dec. 2, 1968,
P 18 12 100.1
Int. Cl. C07d 47/38
U.S. Cl. 260—309.2   3 Claims

ABSTRACT OF THE DISCLOSURE

New and valuable substituted benzimidazoles having the formula

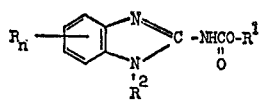

where R denotes halogen, nitro or alkyl, $R^1$ denotes an aliphatic radical, $n$ denotes one of the integers 0, 1 and 2, $R^2$ deotes a carbamic acid radical or an ester radical or the radical of an acid amide and a process for controlling fungi and protecting objects against fungus attack with these compounds.

---

The invention relates to substituted benzimidazoles, especially substituted 1-carbamoyl - 2 - carbalkoxyaminobenzimidazoles and fungicides containing these compounds.

It is known to use tetramethylthiuram disulfide for controlling fungi; however, its action is not satisfactory.

We have now found that a good fungicidal action is achieved with substituted benzimidazoles having the formula

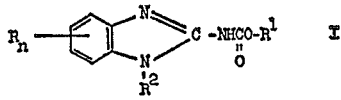   I where R denotes halogen (bromine, preferably chlorine), a nitro or alkyl radical having 1 to 4 carbon atoms (methyl, ethyl, propyl, isopropyl, butyl, isobutyl, sec-butyl, tert-butyl), $R^1$ denotes an aliphatic radical having 1 to 4 carbon atoms (methyl, ethyl, propyl, isopropyl, butyl, isobutyl, sec-butyl, tert-butyl), $n$ denotes one of the integers 0, 1 and 2, $R^2$ denotes the radical

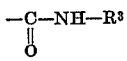

$R^3$ denoting a bicycloaliphatic radical having 8 carbon atoms, a tricycloaliphatic or tetracycloaliphatic radical having a total of 10 to 15 carbon atoms, for example the bicyclo - [3,3,0] - octyl, bicyclo-[2,2,1]-octyl-, bicyclo-[3,2,1]-octyl, methylbicyclo-[2,2,1]-heptyl-, tricyclo-[5,2,1,0$^{2,6}$]-decyl-, tetracyclo-[6,2,1,1$^{3,6}$0$^{2,7}$] - dodecyl-, tricyclo - [6,2,1,0$^{2,7}$] - undecyl-, methyltetracyclo-[6,2,1,1$^{3,6}$0$^{2,7}$]-dodecyl or the bicyclo - [4,3,0] - nonyl radical, $R^3$ further denoting the radical

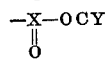

X denoting the radical

$n$ denoting 2 to 6, and $a$ and $b$ denoting hydrogen or methyl, or X denoting lower alkoxyalkyl (ethyloxyethyl, ethyloxypropyl, propyloxypropyl, propyloxyethyl), and X denoting chlorine, alkyl up to 5 carbon atoms (methyl, ethyl, propyl, isopropyl, butyl, isobutyl, sec-butyl, tert-butyl, pentyl) or —O— lower alkyl (O-methyl, O-ethyl, O-propyl, O-butyl), $R^3$ further denoting an alkyloxyalkyl or aryloxyalkyl radical (methoxyethyl, ethoxyethyl, propoxyethyl, isopropoxyethyl, butyloxyethyl, hexyloxyethyl, octyloxyethyl, decyloxyethyl, tridecyloxyethyl, methoxypropyl, ethoxypropyl, propoxypropyl, isopropoxyethyl, butyloxypropyl, octyloxypropyl, methoxybutyl, ethoxybutyl, propoxybutyl, isopropoxybutyl, butyloxybutyl, hexyloxybutyl), an alkylthioalkyl, alkenylthioalkyl, hydroxyethylthioalkyl or arylthioalkyl radical (methylthioethyl, ethylthioethyl, propylthioethyl, allylthioethyl, isopropylthioethyl, n-butylthioethyl, isobutylthioethyl, sec-butylthioethyl, tert-butylthioethyl, pentylthioethyl, hexylthioethyl, octylthioethyl, dodecylthioethyl, benzylthioethyl, phenylthioethyl, furfurylthioethyl, phenylthioethyl substituted by halogen (preferably chlorine), by alkyl (methyl, ethyl, propyl, isopropyl, butyl) or by carboxyl, methylthiopropyl, ethylthiopropyl, propylthiopropyl, allylthiopropyl, isopropylthiopropyl, n-butylthiopropyl, isobutylthiopropyl, sec-butylthiopropyl, tert-butylthiopropyl, pentylthiopropyl, hexylthiopropyl, octylthiopropyl, dodecylthiopropyl, benzylthiopropyl, phenylthiopropyl, furfurylthiopropyl, phenylthiopropyl substituted by halogen (preferably chlorine), by alkyl (methyl, ethyl, propyl, isopropyl, butyl) or by carboxyl, methylthiobutyl, ethylthiobutyl, propylthiobutyl, allylthiobutyl, isopropylthiobutyl, n-butylthiobutyl, isobutylthiobutyl, sec-butylthiobutyl, tert-butylthiobutyl, pentylthiobutyl, hexylthiobutyl, octylthiobutyl, dodecylthiobutyl, benzylthiobutyl, phenylthiobutyl, furfurylthiobutyl, phenylthiobutyl substituted by halogen (preferably chlorine), by alkyl (methyl, ethyl, propyl, isopropyl, butyl), or by carboxyl, or β-hydroxyethylthioethyl), a chloroacetyl radical, a carbalkoxyalkyl radical (carbomethoxymethyl, carbomethoxyethyl, carbethoxymethyl, carbethoxyethyl, carbopropyloxymethyl, carbopropyloxyethyl, carbobutyloxymethyl, carbobutyloxyethyl, carbomethoxypentyl), a carbaryloxyalkyl radical (carbophenoxymethyl, carbophenoxyethyl radical), naphthyl, a phenyl radical substituted by trifluoromethyl and if desired by a further radical (chlorine, bromine) or by an aryloxy radical (chlorophenyloxy radical), which may be substituted by lower alkyl (methyl) or halogen (preferably chlorine), or $R^3$ denoting the radical —SO$_2$—$R^4$, $R^4$ denoting a dialkylamino group (up to 4 carbon atoms) (dimethyl, diethyl, dipropyl, diisopropyl, dibutyl), chloro, methyl, phenyl or toluyl, $R^2$ further denotes the radical

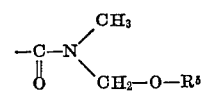

$R^5$ denoting an alkyl radical having 1 to 8 carbon atoms (methyl, ethyl, propyl, isopropyl, n-butyl, isobutyl, sec-butyl, tert-butyl, pentyl, 2-ethylhexyl, 1, 3-dimethylbutyl, 1-methylbutyl), which may be substituted by halogen (chlorine, bromine), an alkenyl radical (allyl, 2,3-dichloroallyl, trichloroallyl) which may be substituted up to 3 times by chlorine, and alkynyl radical having 3 to 6 carbon atoms (propargyl, butyn-1-yl-3, 3,3-dimethylpropyn-1-yl-3,3-methyl-3 - ethylpropyn-1-yl-3,4-chlorobutyn-2-yl-1) which may be substituted by chlorine, a cycloalkyl radical having 6 to 12 carbon atoms (cyclohexyl, cyclooctyl, cyclododecyl) or the radical —(CH$_2$)$_m$—$R^6$, $m$ denoting one of the integers 0, 1 and 2 and $R^6$ denoting phenyl or furyl.

To prepare the compounds according to the invention, an S-alkyl pseudothiourea, which may be present in the form of a salt, preferably as sulfate, is for example used as starting material. This S-alkyl pseudothiourea is reacted with one to two equivalents of a chloroformate having the formula

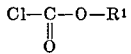

R¹ having the meanings given above. The reaction product formed reacts with o-phenylenediamine having the formula

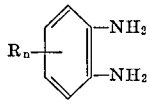

to give benzimidazoles having the formula

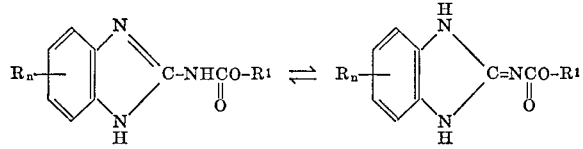

where R¹, R and $n$ have the meanings given above; the further reaction with isocyanates or carbamic acid chlorides results in compounds having the Formula I.

The reaction with isocyanates may be carried out with or without solvents, at atmospheric or superatmospheric pressure and within a wide temperature range, preferably between 20° and 100° C. The reaction is not limited to the use of a certain solvent, but the use of, for example, pyridine is advantageous. The following isocyanates are, for example, suitable for the reaction with compounds of the type

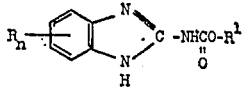

bicyclo-[3,3,0]-octyl isocyanate, bicyclo-[2,2,2]-octyl isocyanate; bicyclo-[3,2,1]-octyl isocyanate; methylbicyclo-[2,2,1]-heptyl isocyanate; tricyclo-[5,2,1,0$^{2,6}$]-decyl isocyanate; tetracyclo-[6,2,1,1$^{3,6}$0$^{2,7}$]-dodecyl isocyanate; ethyloxycarbonylmethyl isocyanate; ethyloxycarbonylethyl isocyanate; 2-ethylthioethyl isocyanate (1); 2-methoxy-1-methylethyl isocyanate (1); 2-methylthioethyl isocyanate (1); 2-ethoxy-1-methylethyl isocyanate (1); methyloxycarbonylamyl isocyanate; methoxypropyl isocyanate; ethoxypropyl isocyanate; N-carbonylsulfamic chloride; naphthyl isocyanate; 3-trifluoromethyl-4-bromophenyl isocyanate; 4 - (4 - chlorophenyloxy) - phenyl isocyanate.

For the reaction with carbamic acid chlorides, which is advantageously carried out in the presence of a compound which binds hydrochloric acid, there are for example used carbamic acid chlorides having the formula

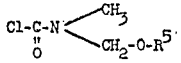

R⁵ having the meaning given above.

The following examples illustrate the preparation of the compounds according to the invention:

EXAMPLE 1

Preparation of 1 - bicyclo - [3,2,1] - octylcarbamoyl-2-carbethoxyaminobenzimidazole; formula:

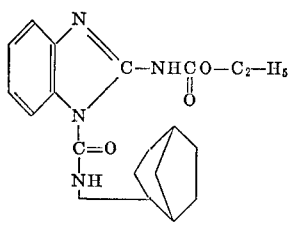

15.2 parts by weight of bicyclo-[3,2,1]-octyl isocyanate is added at room temperature (20° C.) to 20.5 parts by weight of 2-carbethoxyaminobenzimidazole in 300 ml. of pyridine and the whole heated for one hour at 60° C. After concentration in vacuo, the residue is extracted with tetrahydrofuran, the extracts combined and the active ingredient precipitated from the combined extracts with water. Yield: 79% of the theory; melting point: 205° C., slight decomposition >310° C. marked decomposition.

The following active ingredients for example may be prepared analogously:

1 - methoxypropylcarbamoyl - 2 - carbomethoxyaminobenzimidazole, M.P. >310° C. (decomposes), 1 - methoxypropylcarbamoyl - 2 - carbethoxyaminobenzimidazole, M.P. >310° C. (decomposes), 1 - methylmercaptoethylcarbamoyl - 2 - carbomethoxyaminobenzimidazole, sinters >200° C., increasing decomposition >265° C., marked decomposition >290° C., 1 - methylmercaptoethylcarbamoyl - 2 - carbethoxyaminobenzimidazole, M.P. >270° C. (decomposes), 1 - ethylmercaptoethylcarbamoyl - 2 - carbomethoxyaminobenzimidazole, sinters >200° C., increasing decomposition >240° C., marked decomposition >280° C., 1 - ethylmercaptoethylcarbamoyl - 2 - carbethoxyaminobenzimidazole, M.P. 289° to 291° C., sinters >255° C., 1 - ethoxypropylcarbamoyl - 2 - carbomethoxyaminobenzimidazole, sinters and turns brown >220° C., decomposes >300° C., 1 - ethoxypropylcarbamoyl - 2 - carbethoxyaminobenzimidazole, M.P. >300° C. (decomposes after sintering), 1 - carbethoxymethylcarbamoyl - 2 - carbethoxyaminobenzimidazole, M.P. 272° to 274° C. (decomposes), 1 - carbethoxymethylcarbamoyl - 2 - carbomethoxyaminobenzimidazole, M.P. 259° to 261° C., 1 - methylmercaptopropylcarbamoyl - 2 - carbethoxyaminobenzimidazole, M.P. 330° C. (decomposes), 1 - ethylmercaptopropylcarbamoyl - 2 - carbomethoxyaminobenzimidazole, M.P. 330° C. (decomposes).

The active ingredients were identified by elementary analysis and infra-red spectroscopy. They are suitable for controlling injurious fungi in agriculture and for protecting plants against fungus attack.

The fungicides according to this invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C. and one or more than one functional group, e.g. the keto group, ether group, ester group or amide group, this group being attached as substituent to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. diatomaceous earth, talc, clay or fertilizers.

The active ingredients according to the invention may be mixed with other fungicidal active ingredients. The mixture also has a good fungicidal action. A particularly good action is obtained with mixtures of the active ingredients according to the invention (a) with the zinc salt of 1,2-propylenebisdithiocarbamic acid or (b) with a mixture of a zinc-ammonia complex salt of 1,2-propylenebisdithiocarbamic acid and the corresponding thiuram disulfide, or (c) with a mixture of a zinc-ammonia complex salt of ethylenebisdithiocarbamic acid and the corresponding thiuram disulfide, or (d) with N-thiotrichloromethylphthalimide, or (e) with N-dichlorofluoromethylthio-N,N-dimethylaminosulfonic acid anilide.

The following comparative experiments demonstrate the superiority of the compositions according to this invention over known active ingredients.

EXAMPLE 2

The inhibition values with respect to *Botrytis cinerea* and *Fusarium solani* are given in the following table. The active ingredients, in concentrations of 0.002, 0.001 and 0.0001%, are thoroughly mixed with an 8% malt agar. The mixtures are poured into Petri dishes having a diameter of 9 cm.; after solidification of the mixtures, the dishes are centrally inoculated with mycelium flakes of *Botrytis cinerea* and *Fusarium solani*. The dishes are incubated at 22° to 25° C. and the extent of the development of the fungus colony compared with the prior art active ingredients and the control is ascertained after 8 days.

The figures in the table have the following meanings:

0—No fungus growth
1—diameter of the fungus colony: 1-2 cm.
2—diameter of the fungus colony; 2-4 cm.
3—diameter of the fungus colony: 4-5 cm.
4—diameter of the fungus colony: 5-8 cm.
5—diameter of the fungus colony; 9 cm.

0—no fungus growth, graduated down to
5—uninhibited fungus growth (fungus layer on the surface of the nutrient solution is closed)

Active ingredient structure: benzimidazole with C—NHCO—R¹ group at 2-position and R² on N

| Active ingredient | Amount of active ingredient in the nutrient solution in parts per million parts of the nutrient solution | | | | | |
|---|---|---|---|---|---|---|
| | 100 | 50 | 25 | 10 | 5 | 1 |
| $R^1$=CH$_3$; $R^2$=—CO—NH—CH$_2$—CH$_2$—CH$_2$—O—CH$_3$ | 0 | 0 | 0 | 2 | 5 | 5 |
| $R^1$=C$_2$H$_5$; $R^2$=—CO—NH—CH$_2$—CH$_2$—CH$_2$—O—CH$_3$ | 0 | 0 | 1 | 2 | 3 | 4 |
| $R^1$=CH$_3$; $R^2$=—CO—NH—CH$_2$—CH$_2$—CH$_2$—O—C$_2$H$_5$ | 0 | 0 | 0 | 0 | 3 | 3 |
| $R^1$=C$_2$H$_5$; $R^2$=—CO—NH—CH$_2$—CH$_2$—CH$_2$—O—C$_2$H$_5$ | 0 | 0 | 0 | 1 | 4 | 5 |
| $R^1$=C$_2$H$_5$; $R^2$=—CO—NH—CH$_2$COOC$_2$H$_5$ | 0 | 0 | 0 | 3 | 5 | 5 |
| $R^1$=CH$_3$; $R^2$=—CO—NH—CH$_2$COOC$_2$H$_5$ | 0 | 0 | 0 | 3 | 5 | 5 |
| $R^1$=C$_2$H$_5$; $R^2$=—CO—NH—CH$_2$—CH$_2$—S—C$_2$H$_5$ | 0 | 0 | 0 | 3 | 5 | 5 |
| $R^1$=C$_2$H$_5$; $R^2$=—CO—NH—CH$_2$—CH$_2$—S—CH$_3$ | 0 | 0 | 0 | 3 | 4 | 5 |
| $R^1$=CH$_3$; $R^2$=—CO—NH—CH$_2$—CH$_2$—S—C$_2$H$_5$ | 0 | 0 | 1 | 3 | 4 | 5 |
| $R^1$=CH$_3$; $R^2$=—CO—NH—CH$_2$—CH$_2$—S—CH$_3$ | 0 | 0 | 0 | 3 | 4 | 5 |
| $R^1$=C$_2$H$_5$; $R^2$=—CO—NH—(cyclopentyl) | 0 | 0 | 1 | 4 | 5 | 5 |
| Tetramethylthiuram disulfide (prior art active ingredient for comparison purposes) | 1 | 2 | 4 | 5 | 5 | 5 |
| Control (no active ingredient) | | | 5 | | | |

Active ingredient structure: benzimidazole with C—NHCO—R¹ group and R² on N

| Active ingredient | *Botrytis cinerea* percentage active ingredient in the nutrient agar | | | *Fusarium solani* percentage active ingredient in the nutrient agar | | |
|---|---|---|---|---|---|---|
| | 0.002 | 0.001 | 0.0001 | 0.002 | 0.001 | 0.0001 |
| $R^1$=CH$_3$; $R^2$=—CO—NH—CH$_2$—CH$_2$—CH$_2$—O—CH$_3$ | 0 | 0 | 0 | 1 | 1 | 2 |
| $R^1$=C$_2$H$_5$; $R^2$=—CO—NH—CH$_2$—CH$_2$—CH$_2$—O—CH$_3$ | 0 | 0 | 0 | 1 | 1 | 2 |
| $R^1$=CH$_3$; $R^2$=—CO—NH—CH$_2$—CH$_2$—CH$_2$—O—C$_2$H$_5$ | 0 | 0 | 0 | 1 | 1 | 2 |
| $R^1$=C$_2$H$_5$; $R^2$=—CO—NH—CH$_2$—CH$_2$—CH$_2$—O—C$_2$H$_5$ | 0 | 0 | 0 | 0 | 1 | 2 |
| $R^1$=C$_2$H$_5$; $R^2$=—CO—NH—CH$_2$COOC$_2$H$_5$ | 0 | 0 | 1 | 1 | 1 | 2 |
| $R^1$=CH$_3$; $R^2$=—CO—NH—CH$_2$COOC$_2$H$_5$ | 0 | 0 | 0 | 0 | 1 | 2 |
| $R^1$=C$_2$H$_5$; $R^2$=—CO—NH—CH$_2$—CH$_2$—S—C$_2$H$_5$ | 0 | 0 | 0 | 1 | 2 | 2 |
| $R^1$=C$_2$H$_5$; $R^2$=—CO—NH—CH$_2$—CH$_2$—S—CH$_3$ | 0 | 0 | 0 | 1 | 1 | 2 |
| $R^1$=CH$_3$; $R^2$=—CO—NH—CH$_2$—CH$_2$—S—C$_2$H$_5$ | 0 | 0 | 0 | 0 | 1 | 2 |
| $R^1$=CH$_3$; $R^2$=—CO—NH—CH$_2$—CH$_2$—S—CH$_3$ | 0 | 0 | 0 | 0 | 2 | 2 |
| $R^1$=C$_2$H$_5$; $R^2$=—CO—NH—(cyclopentyl) | 0 | 0 | 0 | 2 | 2 | 3 |
| Tetramethylthiuram disulfide | 4 | 5 | 5 | | | |
| Pentachloronitrobenzene (prior art active ingredients for comparison purposes) | | | | 5 | 5 | 5 |
| Control (no active ingredient) | 5 | | | 5 | 5 | |

EXAMPLE 3

The active ingredients are added to a nutrient solution ideally suited for encouraging the growth of the fungus *Aspergillus niger* in amounts of 100, 50, 25, 10, 5 and 1 parts by weight per million parts of nutrient solution. 20 ml. of each solution prepared in this way is inoculated with 0.3 mg. of *Aspergillus fungus* spores in 100 ml. Erlenmeyer flasks. The flasks are heated at 36° C. for 120 hours, after which length of time the extent of the fungus development is judged, preferably with reference to the surface of the nutrient solution.

The figures in the table have the following meanings:

EXAMPLE 4

70 parts by weight of the compound of Example 1 is mixed with 30 parts by weight of N-methyl-α-pyrrolidone; a solution is obtained which is suitable for application in the form of droplets.

EXAMPLE 5

20 parts by weight of the compound of Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of calcium salt of dodecylbenzenesulfonic acid and 5 parts by weight of the adduct of 40 moles of ethylene oxide to 1 mole of castor oil. The solution is poured into 100,000 parts by weight of water and finely dispersed; an aqueous dispersion is obtained which contains 0.02% by weight of the active ingredient.

EXAMPLE 6

20 parts by weight of the active ingredients of Example 1 is well mixed with 3 parts by weight of the sodium salt of diisobutylnaphthalene-α-sulfonic acid, 17 parts by weight of the sodium salt of a ligninsulfonic acid from a sulfite waste liquor and 60 parts by weight of powdered silica gel and triturated in a hammer mill. By finely dispersing the mixture in 20,000 parts by weight of water, a spray liquid containing 0.1% by weight of the active ingredient is obtained.

EXAMPLE 7

3 parts by weight of the compound of Example 1 is thoroughly mixed with 97 parts by weight of particulate kaolin. A dust is obtained containing 3% by weight of the active ingredient.

EXAMPLE 8

30 parts by weight of the compound of Example 1 is thoroughly mixed with a mixture of 92 parts by weight of powdered silica gel and 8 parts by weight of paraffin oil which has been sprayed onto the surface of this silica gel. A formulation of the active ingredient is thus obtained which has good adhering properties.

We claim:
1. A compound of the formula

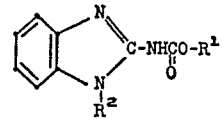

wherein:
$R^1$ is lower alkyl; and
$R^2$ is the radical

$R^3$ denoting lower alkyl substituted by lower thioalkyl.

2. 1 - methylmercaptoethylcarbamoyl - 2 - carbomethoxyaminobenzimidazole.

3. 1-methylmercaptopropylcarbamoyl - 2 - carbethoxyaminobenzimidazole.

References Cited

UNITED STATES PATENTS 3,541,213  11/1970  Klopping _____ 260—309.2

FOREIGN PATENTS 1,523,597  3/1968  France _____ 260—309.2

NATALIE TROUSOF, Primary Examiner

U.S. Cl. X.R.

260—453 A, 453 AR, 453 AL, 543 R; 424—273

PO-1050
(5/69)

UNITED STATES PATENT OFFICE
CERTIFICATE OF CORRECTION

Patent No. 3,660,421          Dated May 2, 1972

Inventor(s) Hans Osieka, Karl-Heinz Koenig, and Ernst-Heinrich Pomme

It is certified that error appears in the above-identified patent and that said Letters Patent are hereby corrected as shown below:

Column 1, line 23, "deotes" should read -- denotes --; line 71 "and X" should read -- and Y --.

Column 2, line 62, "and alkynyl" should read -- an alkynyl --.

Column 7, line 1, "calcium salt of dodecylbenzenesulfonic" should read -- dodecylbenzenesulfonic --.

Signed and sealed this 28th day of November 1972.

(SEAL)
Attest:

EDWARD M. FLETCHER, JR.
Attesting Officer

ROBERT GOTTSCHALK
Commissioner of Patents